(12) United States Patent
Sakamoto et al.

(10) Patent No.: US 7,632,209 B2
(45) Date of Patent: *Dec. 15, 2009

(54) VEHICULAR DRIVE SYSTEM AND DRIVING METHOD

(75) Inventors: Hiroyuki Sakamoto, Hitachinaka (JP); Masahiko Ibamoto, Hitachinaka (JP); Hiroshi Kuroiwa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 343 days.

This patent is subject to a terminal disclaimer.

(21) Appl. No.: 11/634,976

(22) Filed: Dec. 7, 2006

(65) Prior Publication Data

US 2007/0074595 A1 Apr. 5, 2007

Related U.S. Application Data

(63) Continuation of application No. 11/002,140, filed on Dec. 3, 2004, now Pat. No. 7,165,470.

(30) Foreign Application Priority Data

Dec. 4, 2003 (JP) ............................... 2003-405310

(51) Int. Cl.
*B60W 10/02* (2006.01)
(52) U.S. Cl. ........................................................ 477/5
(58) Field of Classification Search .................... 74/339
See application file for complete search history.

(56) References Cited

U.S. PATENT DOCUMENTS 6,159,127 A 12/2000 Loeffler et al.

6,634,986 B2 * 10/2003 Kima .......................... 477/107
6,941,830 B2 * 9/2005 Ibamoto et al. ............... 74/339

(Continued)

FOREIGN PATENT DOCUMENTS

DE 199 40 288 C1 8/1999

(Continued)

OTHER PUBLICATIONS

European Search Report dated Mar. 30, 2009 (Three (3) pages).

*Primary Examiner*—Dirk Wright
(74) *Attorney, Agent, or Firm*—Crowell & Moring LLP

(57) ABSTRACT

In a shift system wherein the transfer of power is performed using a motor, the smaller the gear ratio difference is, the smaller can be made the motor output. However, the number of gears must be increased in order to reduce the gear ratio. As the number of gears increases, the problem of gear noise becomes more serious. It is necessary to prevent both an increase in the number of gears and an increase of the motor output.

In a vehicular drive system according to the present invention, a shifting power unit is not merely provided between a first intermediate shaft and a second intermediate shaft of a shift system which has the two intermediate shafts, but one side of a shifting power unit is connected to a vehicle driving power unit, while an opposite side thereof is connected to a power transfer switching clutch so as to be connected to the first or the second intermediate shaft through a reduction mechanism, whereby the output of the shifting power unit is decreased while minimizing an increase in the number of gears.

2 Claims, 13 Drawing Sheets

U.S. PATENT DOCUMENTS

| | | | |
|---|---|---|---|
| 7,083,545 B2 * | 8/2006 | Ibamoto et al. | 477/5 |
| 7,093,512 B2 * | 8/2006 | Ibamoto et al. | 74/339 |
| 2003/0019313 A1 * | 1/2003 | Ibamoto et al. | 74/339 |
| 2003/0045389 A1 | 3/2003 | Kima | |
| 2005/0050974 A1 * | 3/2005 | Ibamoto et al. | 74/333 |
| 2005/0145051 A1 * | 7/2005 | Sakamoto et al. | 74/325 |

FOREIGN PATENT DOCUMENTS

| | | |
|---|---|---|
| EP | 0 845 618 A2 | 9/1997 |
| EP | 1 429 049 A1 | 6/2004 |
| JP | 10-89456 | 4/1998 |
| JP | 2003-72403 | 3/2003 |

* cited by examiner

EQUIVALENT CONSTRUCTION

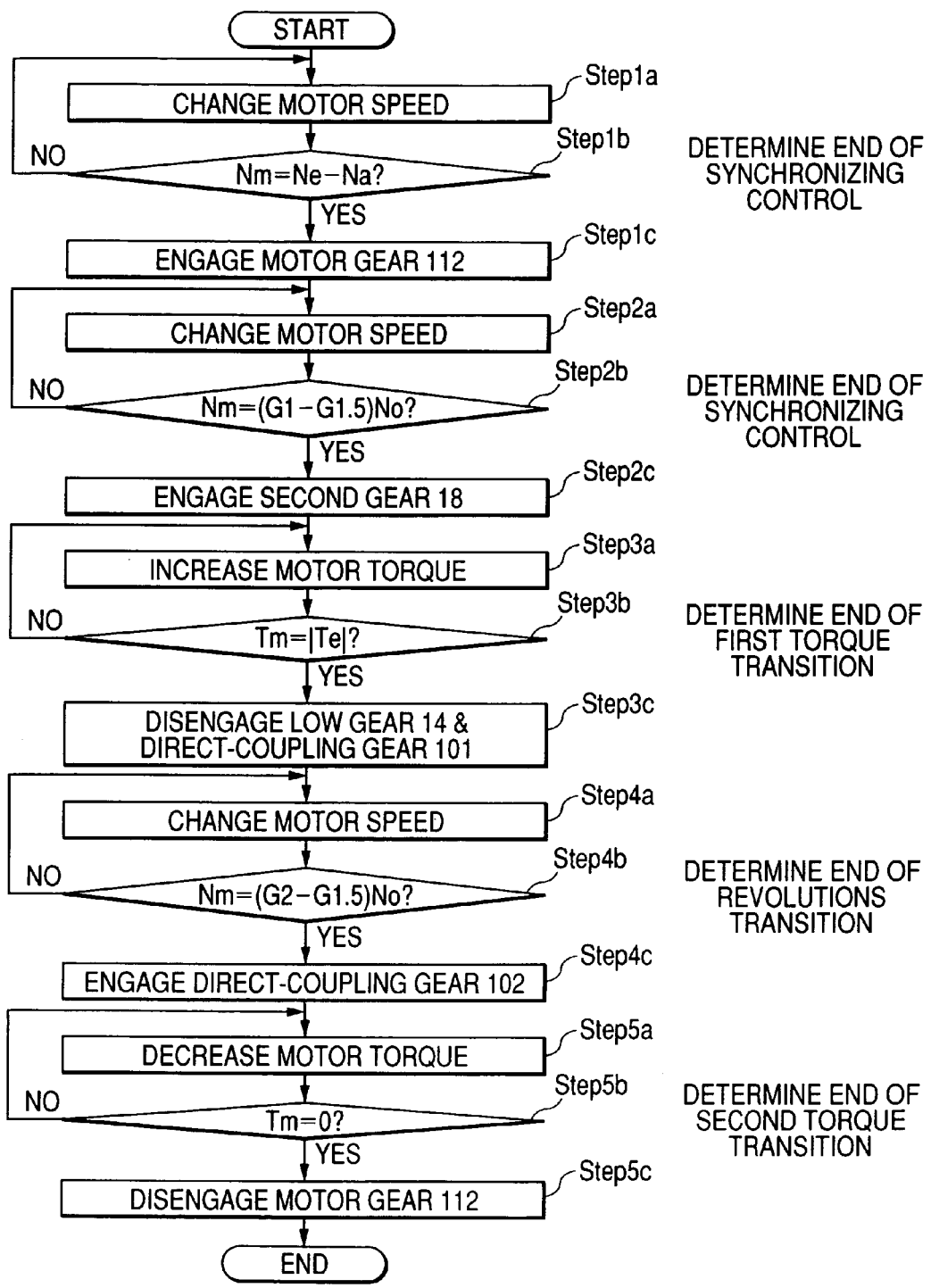

LOW GEAR

PREPARATION FOR SHIFT

FIRST TORQUE TRANSITION

REVOLUTIONS TRANSITION

SECOND TORQUE TRANSITION

SECOND GEAR

SECOND GEAR

PREPARATION FOR SHIFT

FIRST TORQUE TRANSITION

REVOLUTIONS TRANSITION

SECOND TORQUE TRANSITION

LOW GEAR

FOURTH GEAR

PREPARATION FOR SHIFT

FIRST TORQUE TRANSITION

REVOLUTIONS TRANSITION

SECOND TORQUE TRANSITION

SECOND GEAR

VEHICULAR DRIVE SYSTEM AND DRIVING METHOD

CROSS-REFERENCE TO RELATED APPLICATIONS

This application is a continuation of co-pending U.S. patent application Ser. No. 11/002,140.

CLAIM OF PRIORITY

The present application claims priority from Japanese application serial no. 2003-405310 filed on Dec. 4, 2003, the contents of which are hereby incorporated by reference into this application.

BACKGROUND OF THE INVENTION

The present invention relates to an automatic transmission, an automatic transmission control device, an automatic transmission control method, an automatic shift system, and a vehicle using the same.

As a conventional automatic transmission there is used a planetary gear type or parallel-shaft type shift mechanism and there usually is adopted a method wherein a shift is performed by selectively engaging clutches provided individually in gear shift ranges of different transmission gear ratios (see, for example, Japanese Patent Laid-Open No. H10(1998)-89456). The applicant in the present case has proposed such a system as shown in Japanese Patent Application No. 2002-3561245 wherein a parallel-shaft type shift mechanism having two input shafts is combined with a motor to perform a shift actively.

In the system shown in the above application 2002-3561245, gear trains are arranged on two input shafts so as be different in gear ratio to decrease a change in rotation during a shift, whereby the output of a shifting power unit can be decreased. According to this construction, however, the number of gears used becomes twice as large, with a consequent likelihood of an increase of gear noise, mass, and weight.

If the number of gears used is decreased, the output of the shifting power unit will increase.

Further, in the application 2002-3561245, for starting a vehicle driving power unit by the shifting power unit, it is absolutely necessary to engage any of gears connected to an output shaft. Thus, a starting shock is transferred to the vehicle.

SUMMARY OF THE INVENTION

It is an object of the present invention to eliminate the above-mentioned inconveniences and provide a vehicular drive system which provides a high economical effect.

The vehicular drive system of the present invention is characterized in that a shifting power unit is not merely provided between an input shaft and an intermediate shaft, but a mechanism for transferring of power from the input shaft to both first and second intermediate shafts and for cutting off the power is provided; one side of the shifting power unit is connected to the input shaft, while an opposite side thereof is connected to a power transfer switching clutch; and the shifting power unit is connected to the first or the second intermediate shaft through a reduction mechanism. Thereby, the output of the shifting power unit can be decreased while minimizing an increase in the number of gears.

According to the present invention, a gear ratio different from that of reduction gears in a transmission is provided in common, whereby the number of gears used can be decreased without increasing the capacity of a motor which is high in cost, and thus a more outstanding economical effect can be obtained.

Moreover, since the shifting power unit is provided between the first or the second intermediate shaft and the input shaft, a vehicle driving power unit can be started without engaging a gear connected to an output shaft and hence there can be attained a highly quiet drivability without transfer of a starting shock to the vehicle.

BRIEF DESCRIPTION OF THE DRAWINGS

FIG. 5 is a flowchart of a control system in an up-shift;

DETAILED DESCRIPTION OF THE INVENTION

Figure 1:
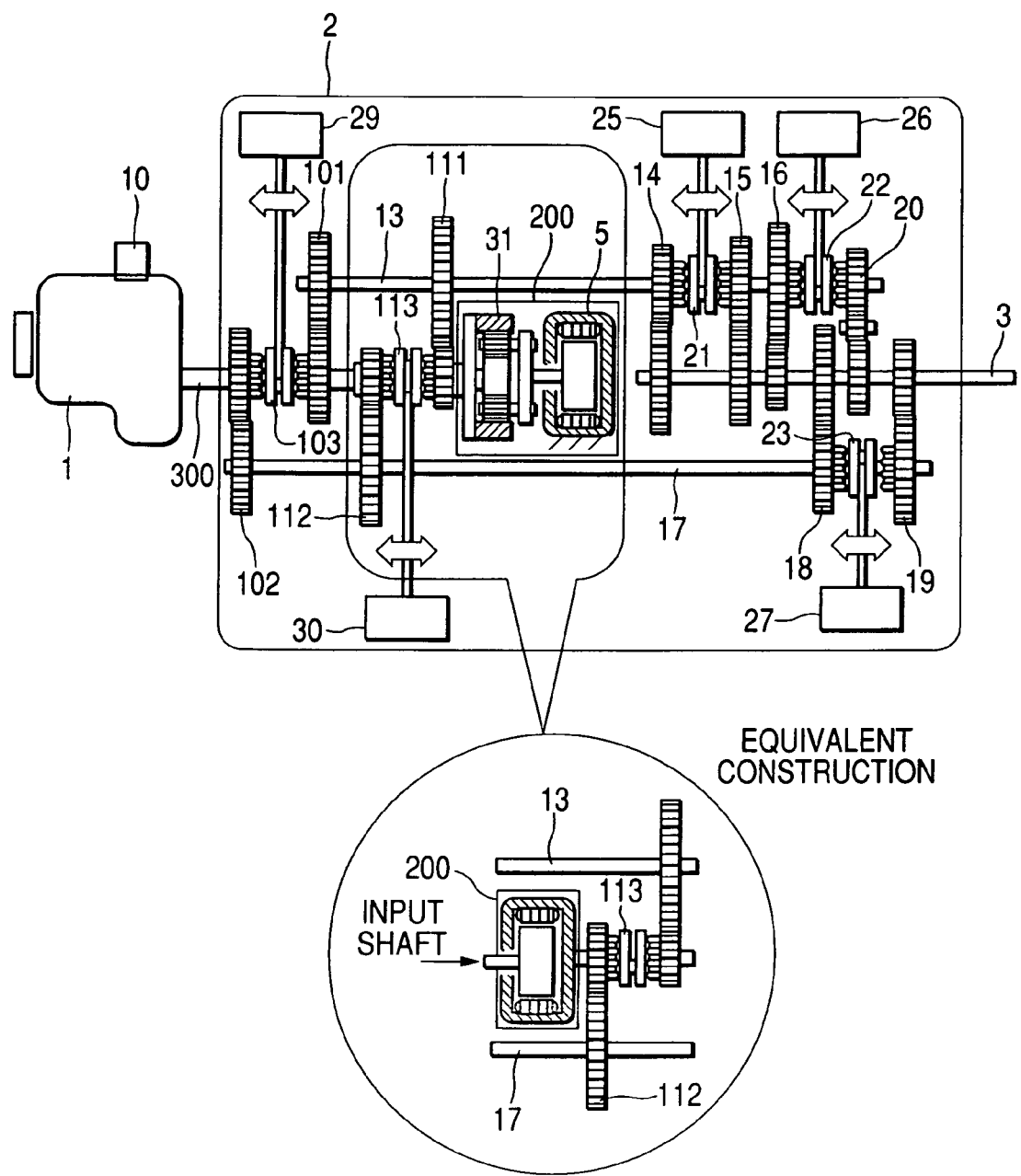
FIG. 1 is a construction diagram a vehicular drive system according to a first embodiment of the present invention.

FIG. 1 is a construction diagram showing a first embodiment of the present invention. A vehicle driving power unit 1 is coupled to an input shaft 300 of a transmission 2. The vehicle driving power unit 1 is generally an internal combustion engine, but may be a power unit having a rotary shaft such as a motor. An output shaft 3 of the transmission 2 is connected to wheels (not shown). With a dog clutch 103, the input shaft 300 can transmit a driving force to a first intermediate shaft 13 and a second intermediate shaft 17 and cut off the supply of the driving force. When the intermediate shaft 13 is selected, it is engaged to the input shaft through a direct-coupling gear 101, while when the intermediate shaft 17 is selected, it is engaged to the input shaft through a direct-coupling gear 102. With shift gears 14, 15, 16, 18, 19, and 20, the first and second intermediate shafts are connected to the output shaft 3 through dog clutches 21, 22, and 23.

The above dog clutches are connected to shift actuators 25, 26, 27, 29, and 30, so that they can be engaged and disengaged with the driving force of the actuators. The actuators are usually automatic device such as a motor type or a hydraulic pressure type. Since the dog clutches and the actuators are of known techniques, detailed descriptions thereof will here be omitted.

The input shaft 300 is connected to one shaft of a shifting power unit 200. The other shaft of the shifting power unit 200 is connected to the first and second intermediate shafts 13, 17 through a dog clutch 113 and further through motor gears 111 and 112. This construction is a feature of the present invention. In this embodiment, though an electric motor is used as the shifting power unit 200, it may be substituted by a friction clutch. That is, the shifting power unit 200 is not specially limited insofar as it has two shafts and can transfer or generate power.

The shifting power unit 200 is constituted by an electric motor 5 and a planetary gear mechanism 31. A rotary shaft of the motor is connected to a planetary gear in the planetary gear mechanism. The input shaft is connected to a sun gear and a ring gear is connected to a switching sleeve side of the dog clutch 113. Thereby the power of the motor is provided to the input shaft and the first or second intermediate shaft. As a result, the power of the motor acts in opposite directions on the input shaft side and on the first or the second intermediate shaft side. For example, if the connection is set so as to increase the rotational speed of the input shaft when the motor generates a positive torque, the torque provided to the intermediate shaft side acts to lower the rotational speed of the intermediate shaft. When an electric motor used is of a construction permitting rotation of both stator and rotor, the motor alone may be installed as in an equivalent construction of FIG. 1.

Figure 2:
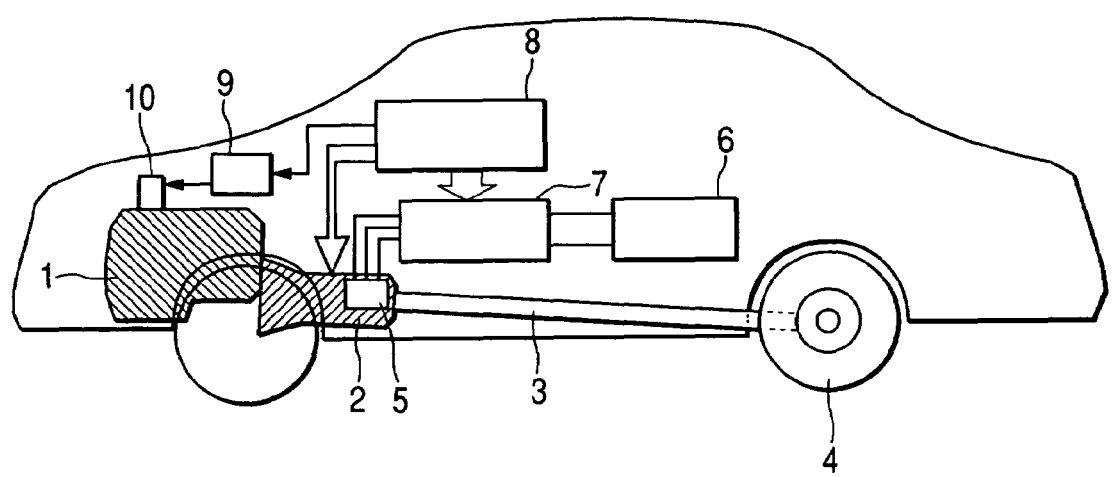
FIG. 2 is a morphological diagram showing a mounted state of the vehicular drive system of FIG. 1 on an automobile.

FIG. 2 is a diagram showing a state in which the vehicular drive system of the present invention is mounted on an automobile. The transmission 2 is connected to the vehicle driving power unit 1. The output shaft 3 drives 5 wheels 4 through a differential gear. The motor 5 is installed within the transmission 2. A motor controller 7 is connected electrically to the motor 5 and a battery 6 as a power supply of the motor controller 7 is mounted on the automobile. Many automobiles employ a lead storage battery, but in the system of the present invention the number of times of charge and discharge is large, thus causing deterioration of the battery. In the system, since charge and discharge are sure to occur during a shift, there is little change in the amount of stored electricity before and after the shift. Thus, it is also possible to use a capacitor of a large capacitance which has recently been marketed. If the capacitance stored and the capacitance outputted are sufficient, as the mounting method of the capacitance, either of mounting the capacitor in parallel with the battery and mounting it alone is good enough.

An electronic controlled throttle valve 10 is provided in the vehicle driving power unit 1, whereby the output of the vehicle driving power unit 1 can be controlled in accordance with a request signal.

A shift controller 8 not only controls the torque and the number of revolutions of the motor 5 through the motor controller 7 but also controls the output of the vehicle driving power unit 1 through a vehicle driving power controller 9 and further through the electronic controlled throttle valve 10. Further, the shift controller 8 commands the operation of the shift actuators 25 to 27 and 29 to 30.

Figure 3:
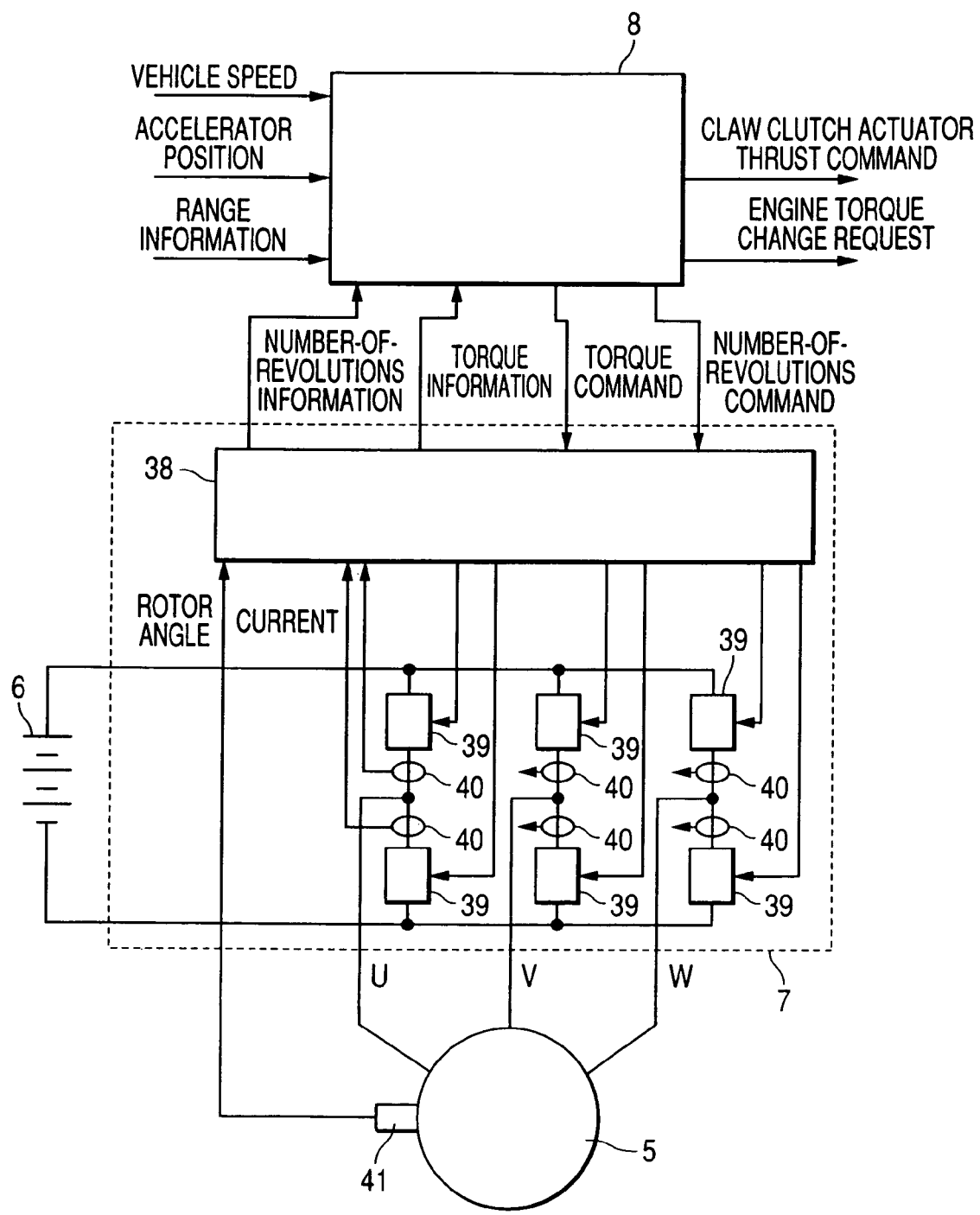
FIG. 3 is a construction diagram related to a control system shown in FIG. 1.

FIG. 3 shows a control system in the case of using a motor as the shifting power unit 200. For example, the motor 5 is a permanent magnet synchronous motor and is supplied with three-phase alternating currents U, V, W by the motor controller 7. High-speed switching elements 39 are provided respectively in three-phase arms of an inverter of the motor controller 7 to convert a direct-current voltage from the battery 6 to a three-phase alternating current of a variable frequency. Upon receipt of a torque command and a number-of-revolutions command from the shift controller 8, an inverter controller 38 not only controls a current passing rate of the inverter but also feeds back the output of current sensors 40 in each arm and the output of a rotor angle detecting position sensor 41 and makes control so that the torque and the number of revolutions of the motor 5 become respective commanded values. Such a control is publicly known in the field of power electronics and therefore a detailed explanation thereof will here be omitted.

Figure 4A:
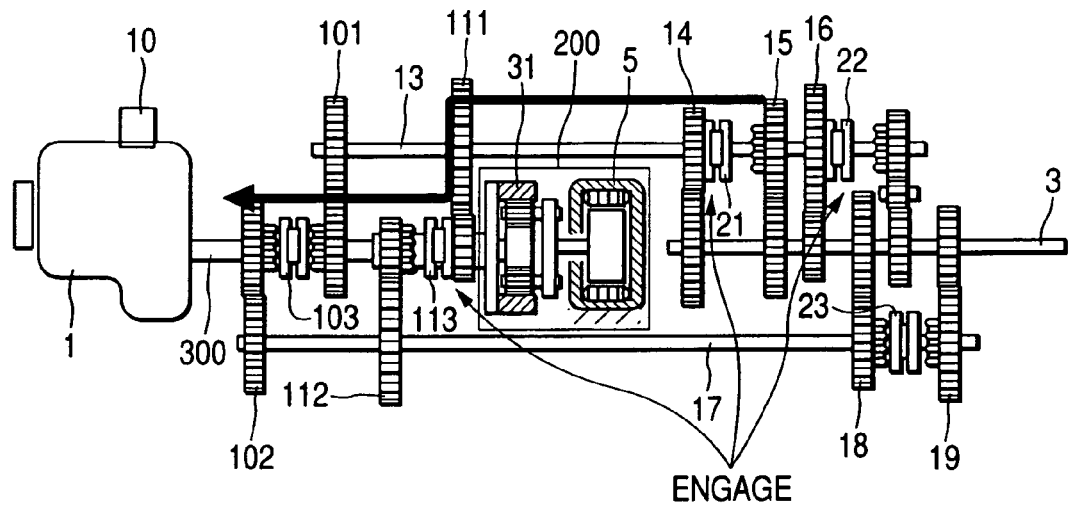
FIG. 4 shows a torque transfer path at the time of start-up of an engine in FIG. 1.
Figure 4B:
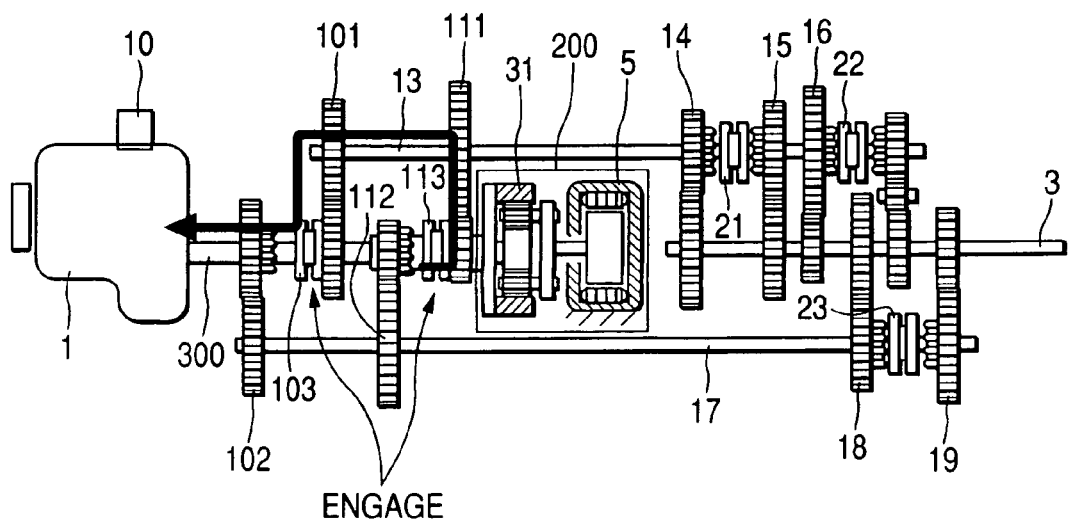
Figure 6A:
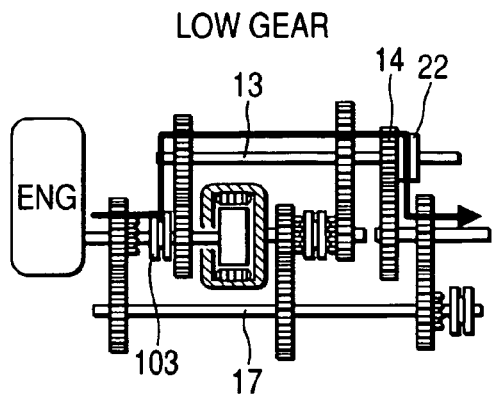
FIG. 6 shows changing torque transfer paths and operations of claw clutches in an up-shift.
Figure 6B:
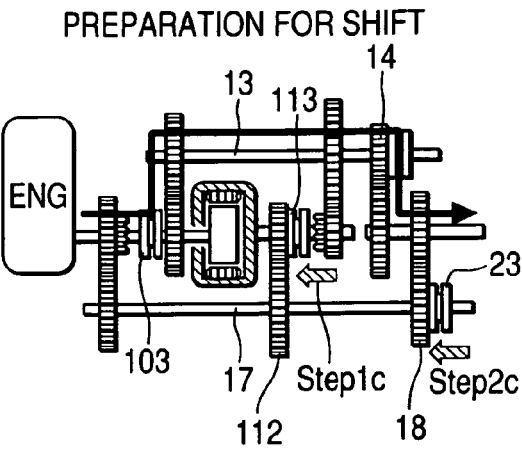
Figure 6C:
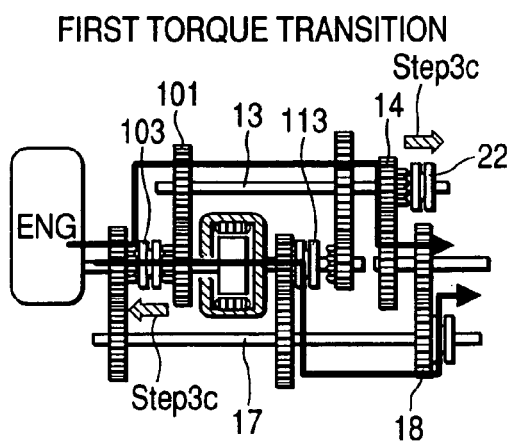
Figure 6D:
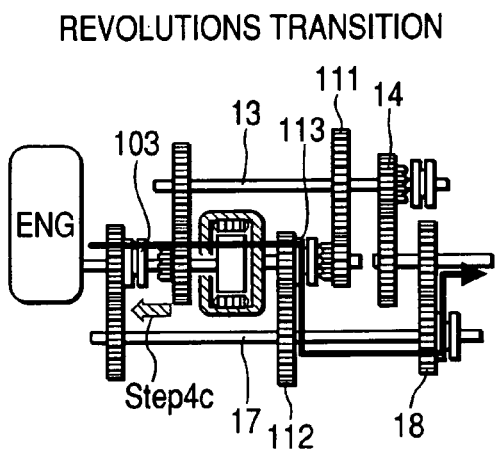
Figure 6E:
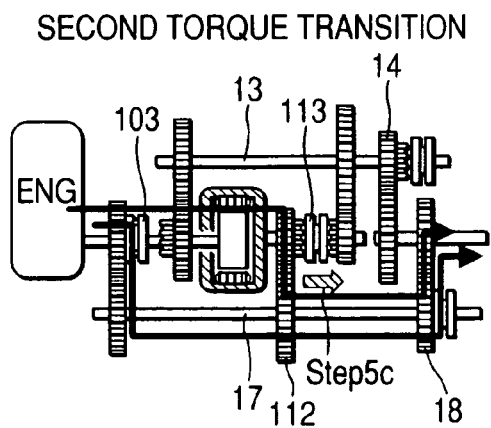
Figure 6F:
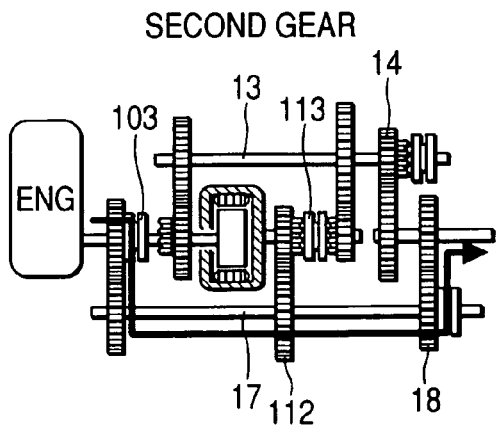

FIG. 4 shows engaged positions of dog clutches for starting an internal combustion engine (merely "engine" hereinafter) and a torque transfer path in the case of using the engine as the vehicle driving power unit 1.

In FIG. 4(*a*), the first intermediate shaft is fixed by engaging dog clutches 21 and 22 simultaneously, and when the dog clutch 113 is engaged with the first intermediate shaft, all the torque is applied to the engine 1. Therefore, if torque is applied in the starting direction of the engine 1, the engine begins rotating and becomes rotatable for itself.

With gears on the output shaft thus engaged, however, it is impossible to completely eliminate such a vibration factor as backlash even if the first intermediate shaft is fixed. In the present invention, if a torque transfer path which circulates between the motor 5 and the engine 1 is formed as in FIG. 4(*b*), it is possible to start the engine even without engagement of gears on the output shaft. This principle utilizes the fact that the torque applied to the input shaft 300 differs due to different gear ratios of both shafts of the shifting power unit 200. One shaft of the shifting power unit 200 is directly coupled (gear ratio 1:1) to the input shaft, while the other shaft is connected through the gear 111 to the input shaft. Therefore, if the gear ratio of the gear 111 is 1.4 for example, the difference becomes 1.4−1=0.4. Thus, if 100 Nm is applied as the motor torque, 40 Nm torque is applied to the input shaft and the engine begins to start up. With a torque of about 50 Nm at an ordinary temperature, engine can start. It follows that the application of 125 Nm suffices as the motor torque.

Figure 7:
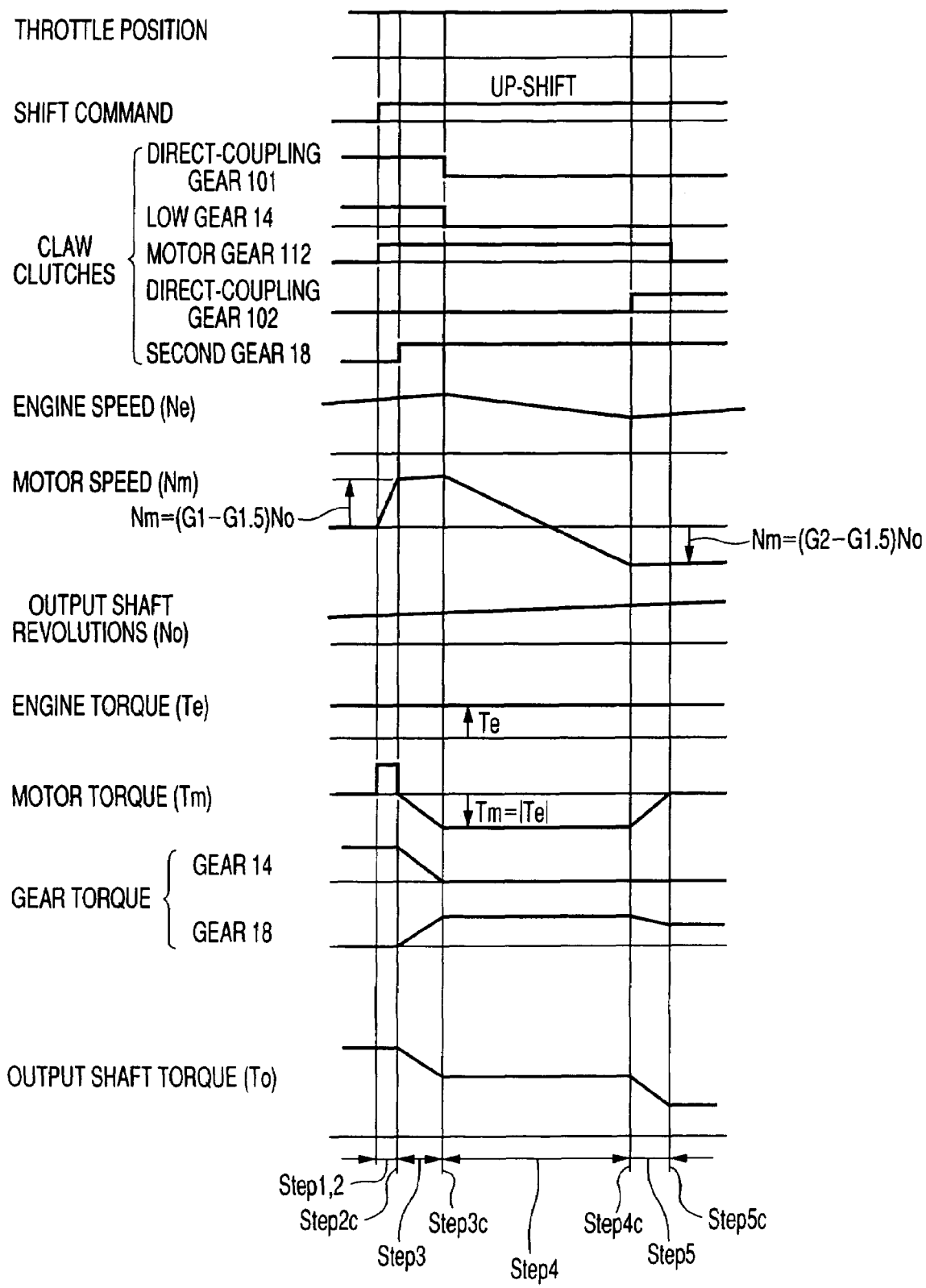
FIG. 7 is a time chart of torque and the number of revolutions in an up-shift.

FIG. 5 is a flowchart of the control system in up-shift. With 1→2 power ON up-shift as an example, a gear switching state and a state of torque transition are shown. In FIG. 6, changing torque transfer paths and operations of claw clutches (mesh type clutches) are shown in correspondence to steps in FIG. 5. FIG. 7 is a time chart of torque and the number of revolutions in various portions.

While the automobile is running with the low gear 14 engaged, the motor speed is controlled in Step 1*a*, then in Step 1*b* the motor speed is changed until the relation between the engine speed Ne and the number of revolutions Na of the second intermediate shaft is determined to be in a synchronized state. In Step 1*c*, the dog clutch 113 is operated to engage the gear 112.

Next, in Step 2*a* the motor speed is controlled, then in Step 2B the motor speed is changed until determination of a synchronous state of the second gear 18. With the second gear 18 engaged in Step 2*c*, the motor 5 races at a motor speed of (N1−N2).

$$\text{Since } N2 = G1.5 \times No \quad \text{(Eq. 1)}$$

$$N1 = G1 \times No \quad \text{(Eq. 2),}$$

N1>N2 and (N1−N2) takes a positive value. In Eq. 1, G1.5 stands for the product of gear ratios of the second gear 18 and the motor gear 112, and G1 stands for a gear ratio of the low gear.

If the motor torque is increased in a negative direction (a direction in which the torque serves as a driving force for the output shaft and as a load for the engine) in Step 3*a*, an input torque of the second gear increases, while that of the low gear decreases. This is a torque transition process called torque phase.

In the torque transition, which is from the intermediate shaft 13 to the intermediate shaft 17, since the value of the motor torque Tm is made negative, an input torque T2 of the second gear 18 increases, while an input torque T1 of the low gear 14 decreases, and when the motor torque Tm reaches −Te, T1 becomes equal to zero and T2 equal to Te.

In Step 3b, the shift controller 8 determines the end of torque phase, that is, determines that the input torque of the low gear 14 is zero. However, since in many cases it is impossible to detect a gear input torque directly, a value (Tm=|Te|) obtained when an actual motor torque has become equal to the absolute value of the engine torque can be regarded as the gear input torque being zero. In this case, it is necessary that the engine torque Te be determined beforehand by detection or by calculation. A concrete method for the detection or the calculation is disclosed in Japanese Patent Laid-Open Nos. H5(1993)-240073 and H6(1994)-317242 and therefore an explanation thereof will here be omitted.

In Step 3c, the low gear is disengaged. Since T1=0, the low gear can be disengaged easily without any change in the operation of the transmission. The direct-coupling gear 101 is also disengaged for direct coupling to the second gear.

Upon disengagement of the low gear, the engine speed becomes changeable.

When the shift controller 8 issues a motor speed change command in Step 4a, the engine speed changes toward an input number of revolutions of the second gear. This is a revolutions transition process called inertia phase.

In the case of 1→2 up-shift, if the motor speed is decreased while maintaining Tm=−Te, the motor speed drops, then the rotational direction reverses and the motor speed rises in a negative direction.

In Step 4b, the shift controller 8 determines the end of inertia phase by detecting a synchronized state of the engine speed with the input number of revolutions of the subsequent gear.

In Step 4c, the shift controller 8 operates the dog clutch 103 to engage the direct-coupling gear 102. Because of the synchronized state, the gear 102 can be engaged easily without causing any change in the operation of the transmission.

In Step 5a, the shift controller 8 issues a motor torque decreasing command, making the motor torque zero, whereupon the engine torque Te which has been transferred to G1.5 through the motor 5 shifts to the second gear.

In Step 5b, the shift controller 8 determines the end of the second torque phase by detecting that the motor torque Tm is zero.

In Step 5c, the shift controller 8 disengages the motor gear 112 and terminates the shift. Since Tm is zero, the motor gear can be disengaged easily without causing any change in the operation of the transmission.

Figure 8:
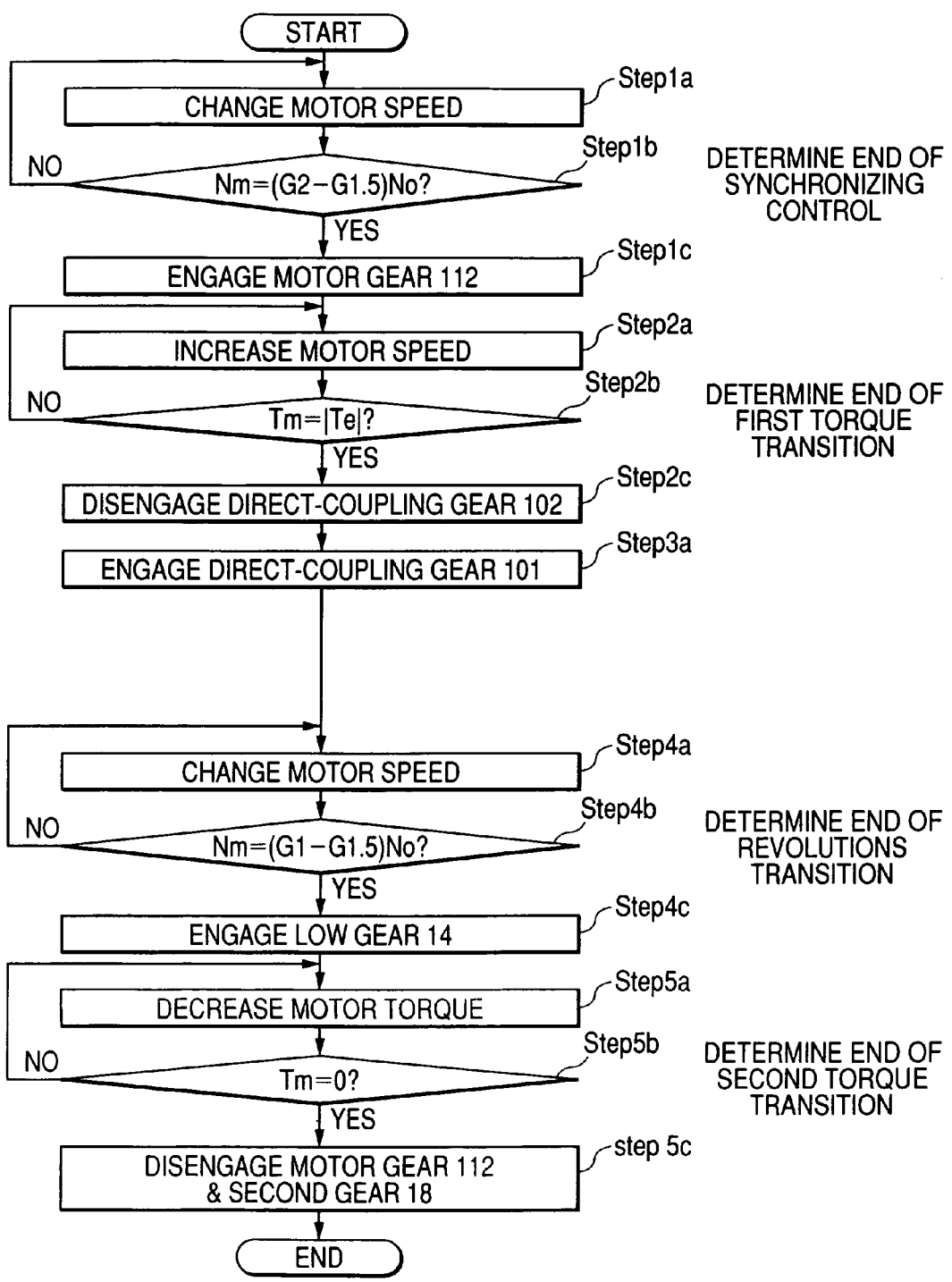
FIG. 8 is a flowchart of the control system in a down-shift.
Figure 9A:
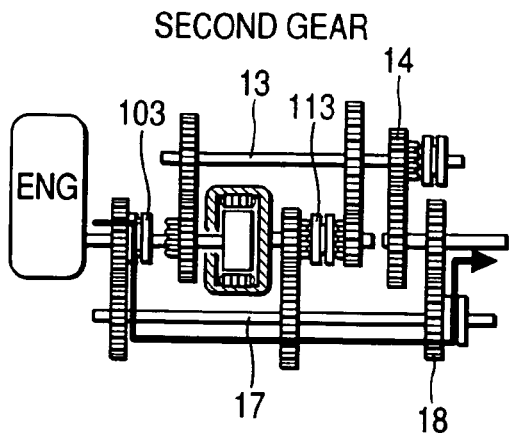
FIG. 9 shows changing torque transfer paths and operations of claw clutches in a down-shift.
Figure 9B:
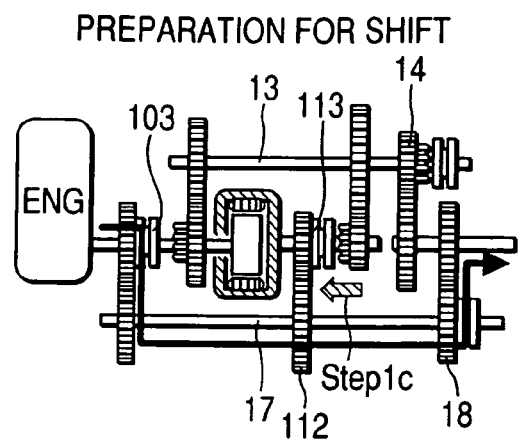
Figure 9C:
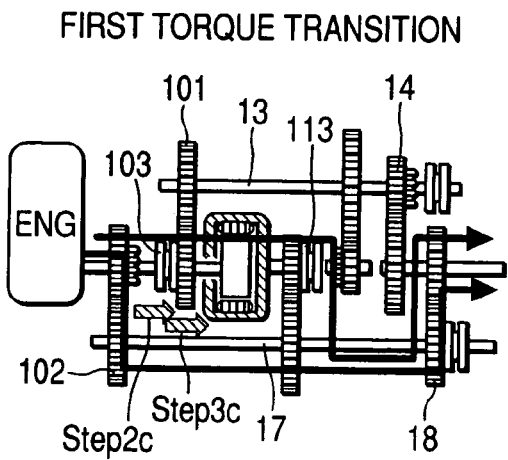
Figure 9D:
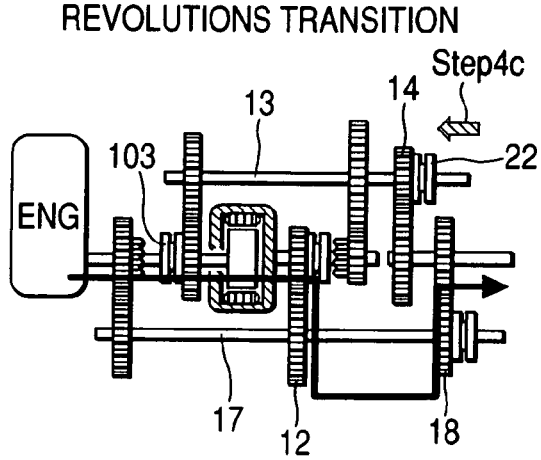
Figure 9E:
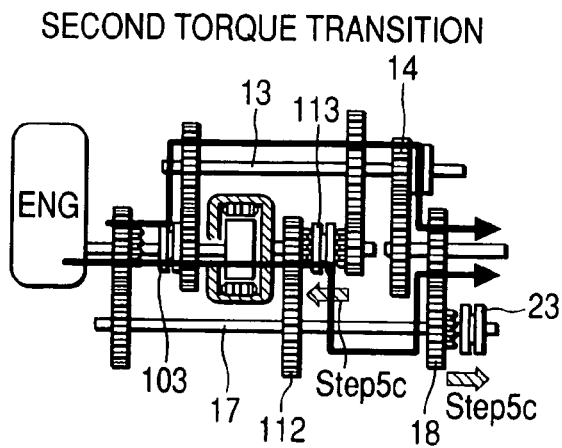
Figure 9F:
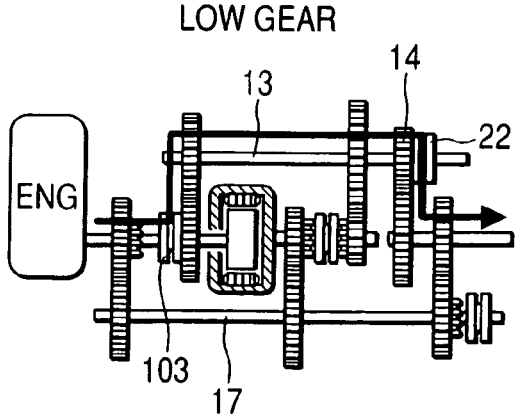
Figure 10:
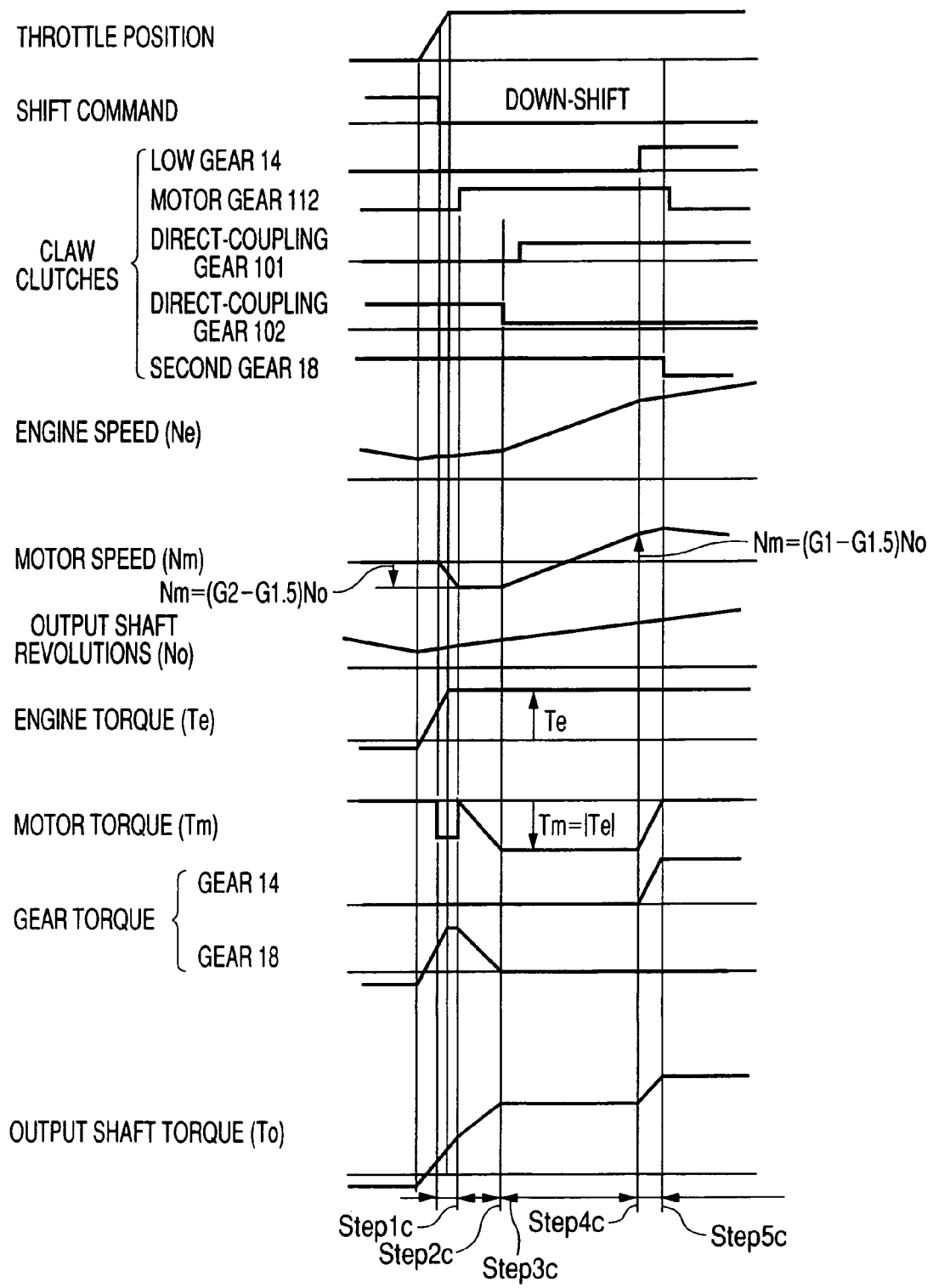
FIG. 10 is a time chart of torque and the number of revolutions in a down-shift.
Figure 11A:
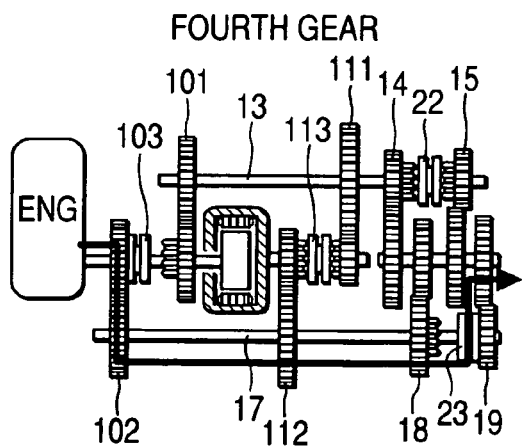
FIG. 11 shows changing torque transfer paths and operations of claw clutches in a jump shift.
Figure 11B:
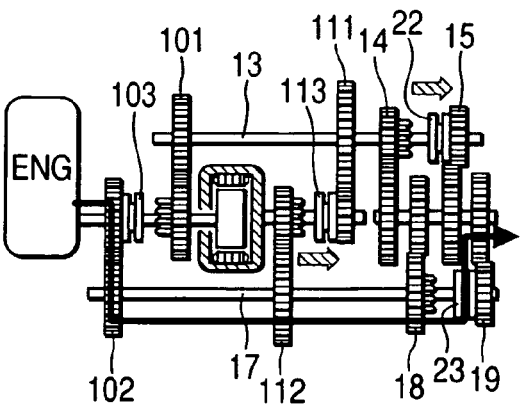
Figure 11C:
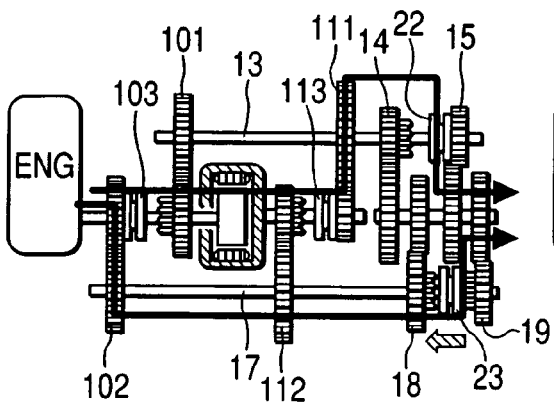
Figure 11D:
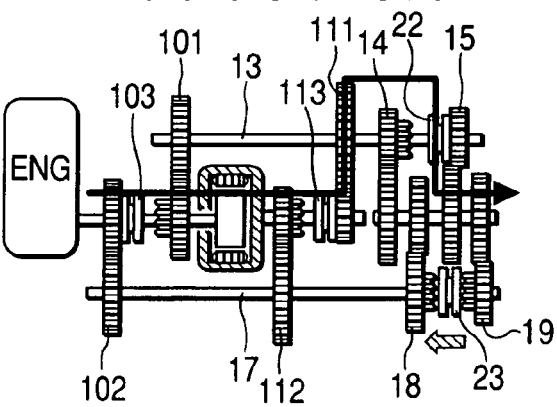
Figure 11E:
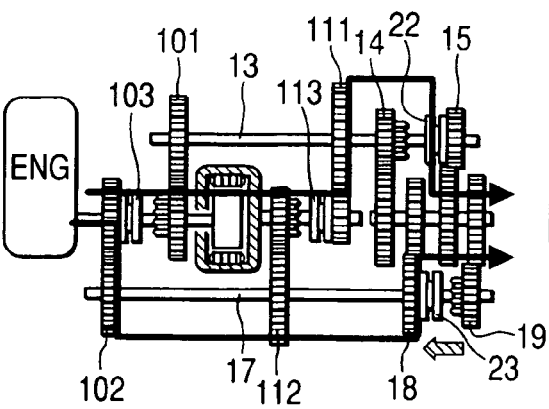
Figure 11F:
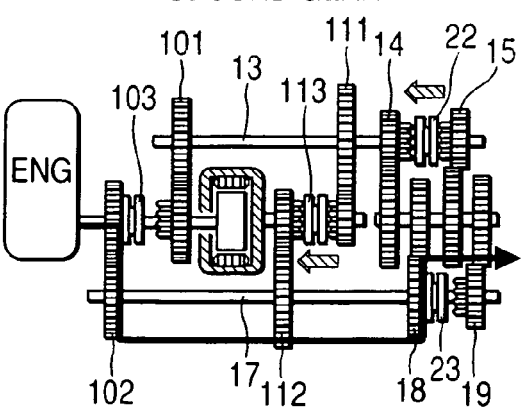

FIG. 8 is a flowchart of the control system in pedal depressing down-shift. FIG. 9 shows changing torque transfer paths and operations of claw clutches, for example in the case of 2→1 down-shift. FIG. 10 is a time chart of torque and the number of revolutions in various portions.

While the automobile is running with the second gear engaged, the motor speed is controlled in Step 1a and is changed in Step 1b until a synchronized state of the motor gear 112 is determined.

When the motor gear 112 engages in Step 1c, the motor 5 races at a motor speed of (N1−N2).

$$\text{Since } N2 = G1.5 \times No \quad \text{(Eq. 3)}$$

$$N1 = G2 \times No \quad \text{(Eq. 4)},$$

N1<N2 and (N1−N2) takes a negative value.

If the motor torque is increased in a negative direction (a direction in which the torque serves as a driving force for the output shaft and as a load for the engine) in Step 2a, an input torque of the low gear increases, while that of the second gear decreases. This is a torque transition process called torque phase.

In the torque transition, which is from the intermediate shaft 17 to the intermediate shaft 13, the motor torque is increased in the negative direction, the input torque T2 of the low gear 14 increases, the input torque T1 of the second gear 18 decreases, and when the motor torque Tm reaches −Te, T1 becomes equal to zero and T2 equal to Te.

In Step 2b, the shift controller 8 determines the end of torque phase, that is, determines that the input torque of the second gear 18 is zero. However, in the case where the input torque of the gear cannot be detected directly, the determination can be done by detecting that the actual motor torque is equal to the absolute value of the engine torque (Tm=|Te|).

In Step 2c, the shift controller 8 makes the dog clutch 103 operate to disengage the direct-coupling gear 102. In Step 3a, the shift controller 8 makes the dog clutch 103 further operate to engage the direct-coupling gear 101. With T1=0, the disengagement can be done easily without causing any change in the operation of the transmission.

Upon disengagement of the direct-coupling gear 102, the engine speed becomes changeable.

When the shift controller 8 issues a motor speed change command in Step 4a, the engine speed changes toward an input number of revolutions of the low gear. This is a revolutions transition process called inertia phase.

In the case of 2→1 down-shift, if the motor speed is increased while maintaining Tm=−Te, the motor speed increases, then the rotational direction reverses and the motor speed rises in the positive direction.

In Step 4b, the shift controller 8 determines the end of inertia phase by detecting a synchronized state of the engine speed with the input number of revolutions of the subsequent gear.

In Step 4c, the shift controller 8 operates the dog clutch 22 to engage the low gear 14. Because of the synchronized state, the low gear 14 can be engaged easily without causing any change in the operation of the transmission.

In Step 5a, the shift controller 8 issues a motor torque decreasing command, making the motor torque zero, whereupon the engine torque Te which has been transferred to the motor gear 112 through the motor 5 shifts to the low gear 14.

In Step 5b, the shift controller 8 determines the end of the second torque phase by detecting that the motor torque Tm is zero.

In Step 5c, the shift controller 8 operates the dog clutches 113 and 23 to disengage the motor gear 112 and the second gear 18 and terminates the shift. Since Tm is zero, both gears can be disengaged easily without causing any change in the operation of the transmission.

Reference has so far been made to 1-2 up-shift and 2-1 down-shift, but in the case of performing 1-2 up-shift, the shift can be performed in accordance with the 2-1 down-shift procedure. Conversely, when performing 2-1 down-shift, the 1-2 up-shift procedure may be adopted. However, at certain gear ratios of the motor and the first and second intermediate shafts, the motor output cannot be decreased if the shift is performed in accordance with the said reverse procedure. In short, although the shift can be performed no matter which of the motor gears 111 and 112 may be selected, the motor output during a shift can be decreased to a maximum of one half if the product of gear ratios of the motor gear selected and a shift gear during a revolutions transition is set so as to lie between the gear ratios before and after the shift. An explanation of this point will now be given using actual numerical values. For example, it is assumed that the low gear ratio is 3.0, the second gear ratio is 1.0, the motor gear ratio is 2.0, and the gear used during a revolutions transition is the low gear. The product of gear ratios is 3.0×2.0=6.0, not lying between the low gear ratio and the second gear ratio. In this case, therefore, it is impossible to decrease the motor output. If the second gear is used during a revolutions transition, the product of gear ratios is 1.0×2.0=2.0, just corresponding to half of the low and second gear ratios, so that the motor output is one half and thus can be changed.

Also with respect to the other shift ranges, if no distinction is made as to which of the procedures is to be adopted, all the shifts to adjacent ranges (e.g., 3-2 shift and 3-4 shift if the automobile is running at the third gear) can be done in accordance with the foregoing control procedure. Furthermore, for example, in the case of 2-3 shift, which is an up-shift, the shift is performed in accordance with the procedure of 1-2 up-shift. However, since the shift is from the second to the first intermediate shaft, there inevitably is a difference of gears and the first and the second are reversed with respect to the shafts.

Thus, since the motor output can be changed by the product of gear ratios during a shift, the gear ratio of the motor gear used is changed so as to permit an optimum shift. If this gear ratio is set in the range of about 1.0 to 1.5, the invention is applicable to almost all the automobiles available on the market.

Although the above description premises that the direct-coupling gear is used at a gear ratio of 1:1, the motor torque at the start-up of the engine can be decreased by making the direct-coupling gear have a gear ratio other than 1:1. For example, if the motor gear ratio is set at 1.4 and the direct-coupling gear ratio at about 1.2, the torque of the motor which starts the engine at 50 Nm becomes about 74 Nm. Thus, 51 Nm can be decreased in comparison with the case where the direct-coupling gear ratio is set at 1.0.

Also in the case of a coast down shift, the algorithm of FIG. 8 can be used as it is. Although the direction of torque is reverse to that shown in FIG. 9, it is the same if a negative torque is taken into account. The operations of the claw clutches are also the same.

Steps 1a to 1c are just the same as in the pedal depressing down-shift.

If the motor torque is increased in a positive direction (a direction in which the torque serves as a braking force for the output shaft to assist the engine output) in Step 2a, a negative torque of the low gear increases, while a negative torque of the second gear decreases. This is a torque transition process called torque phase.

Since this torque transition is from the intermediate shaft 17 to the intermediate shaft 13 and the value of the motor torque Tm is made negative, the input torque of the low gear 14 increases, while the input torque of the second gear 18 decreases. When the motor torque Tm reaches −Te, T1 becomes zero and T2 becomes equal to Te.

In Step 2b, the shift controller 8 determines the end of torque phase.

In Step 2c, the dog clutch 103 is operated to disengage the direct-coupling gear 102. In Step 3a, the dog clutch 103 is further operated to engage the direct-coupling gear 101. Since T1 is zero, the disengagement can be done easily without causing any change in the operation of the transmission.

Upon disengagement of the direct-coupling gear 102, the engine speed becomes changeable.

In Step 4a, when the shift controller 8 issues a motor speed change command, the engine speed changes toward an input number of revolutions of the low gear. This is a revolutions transition process called inertia phase.

In the case of 2→1 coast down shift, if the motor speed is increased, the rotational direction reverses and the motor speed rises in a positive direction.

In Step 4b, the shift controller 8 determines the end of inertia phase by detecting a synchronized state of the engine speed with the input number of revolutions of the subsequent gear.

In Step 4c, the dog clutch 22 is operated to engage the claw clutch of the low gear 14. Because of the synchronized state, the claw clutch can be engaged easily without causing any change in the operation of the transmission.

In Step 5a, the shift controller 8 issues a motor torque decreasing command, making the motor torque zero, whereupon the engine torque Te which has been transferred to the second gear 18 through the motor 5 shifts to the low gear 14.

In Step 5b, the shift controller 8 determines the end of the second torque phase by detecting that the motor torque Tm is zero.

In Step 5c, the shift controller 8 operates the dog clutch 113 to disengage the motor gear 112 and the second gear 18 and terminates the shifting. Since Tm is zero, the disengagement can be done easily without causing any change in the operation of the transmission.

As will be seen from the above, the only difference from the pedal depressing down-shift is that the direction of torque is reverse. The relation of the number of revolutions is just the same.

In connection with FIGS. 5 to 10, reference has been made to an example of how to make a shift to adjacent shift ranges. According to this method, it is also possible to make a jump shift. FIG. 11 refers to an example of 4→2 pedal depressing down-shift, showing changing torque transfer paths and operations of claw clutches.

(a) shows a state in which the automobile is running at the fourth gear.

In (b), the motor speed is synchronized with the rotational speed of the first intermediate shaft 13 to engage the motor gear 111.

By controlling the motor speed so as to become equal to (the rotational speed of the intermediate shaft 13)×(gear ratio of the motor gear 111), the third gear 15 can be engaged when the relative rotational speed of the dog clutch 22 becomes zero.

As in (c), two torque transfer paths are formed. When the motor torque is applied, as in the foregoing down shift, the transfer torque shifts from the second to the first intermediate shaft to disengage the fourth gear 19.

In (d), the torque imposed on the shaft of the shifting power unit becomes the product of the third gear ratio and the motor gear ratio. The motor output can be decreased by setting this product at a value between the second and third gear ratios. Further, if the motor torque is increased to the rising side of the engine speed, the transmission gear ratio changes from the fourth gear toward the second gear.

In (e), upon reaching the second gear ratio, the second gear 18 is engaged by the dog clutch 23. The engagement is shock-free because of a synchronized rotation.

In (f), the motor gear 112 and the third gear 15 are disengaged to terminate the shift.

It is seen that even if the gear ranges to be shifted are away from each other like the second gear and the fourth gear, the shift can be done through the first intermediate shaft from the second intermediate shaft with use of the motor gear 111 or 112.

For example in the conventional twin clutch transmission, a jump shift requires cutting off the torque because it is impossible to make a power-on shift. However, according to the method of this embodiment, a shift can be done in a perfect manner and therefore the drivability is improved.

The following outstanding effects can be obtained by the method of this embodiment.

The motor output required at the time of performing a shift is represented as follows:

$$Pm = |N1 - N2| \times Te \qquad \text{(Eq. 5)}$$

The energy required for a shift is represented by Pm×time. When the motor speed and the motor torque are different such that one is positive and the other is negative, this state is a state of regeneration, in which the battery is charged. On the other hand, when both motor speed and motor torque are positive or negative, electric power is supplied from the battery. That is, in the case of a power-on up-shift, the battery is charged in the first half of the shift and is discharged in the latter half of the shift. Conversely, in the case of a pedal depressing down-shift, the battery is discharged in the first half of the shift, while in the latter half of the shift the battery is charged. Also in the case of a pedal return up-shift and a coast down-shift, both charge and discharge are performed during one shift. Thus, when one shift is over, the battery reverts to its original stage. It follows that the battery capacity necessary for a shift may be a capacity able to charge and discharge the energy for one shift.

In a conventional, similar, motor-driven shift method, all of one shift lies in the charge region in the case of an up-shift, while it lies in the discharge region in the case of a down-shift. Therefore, if an up-shift is performed up to the fifth gear, followed by a down-shift to the low gear, it follows that charging is performed five times and thereafter discharging is performed five times, thus requiring a battery capacity of five times as much. In contrast therewith, in the method of this embodiment, a one-tenth battery capacity suffices and thus an outstanding economical effect is obtained.

According to the system disclosed in Japanese Patent Application No. 2002-3561245 filed by the applicant in the present case, in the case of a transmission having six forward ranges and one reverse range, as large as twenty-seven gears, seven dog clutches and seven actuators are required even if gears provided on an output shaft are made common. In contrast therewith, in the present invention, twenty-one gears, six dog clutches and six actuators suffice and thus a more outstanding economical effect can be attained. This difference in the number of constituent elements becomes more significant as the number of gear ranges increases. In the manual transmission, the shift ranges have so far increased like 3rd→4th→5th→6th. A certain truck has shift ranges exceeding ten. Also in the case of automatic transmissions, one having six shift ranges has recently been developed. Taking such a recent trend, it can easily been seen that the present invention is very important.

Thus, in the present invention, a shift can be done while suppressing the number of constituent elements and the output of the shifting power unit.

Figure 12:
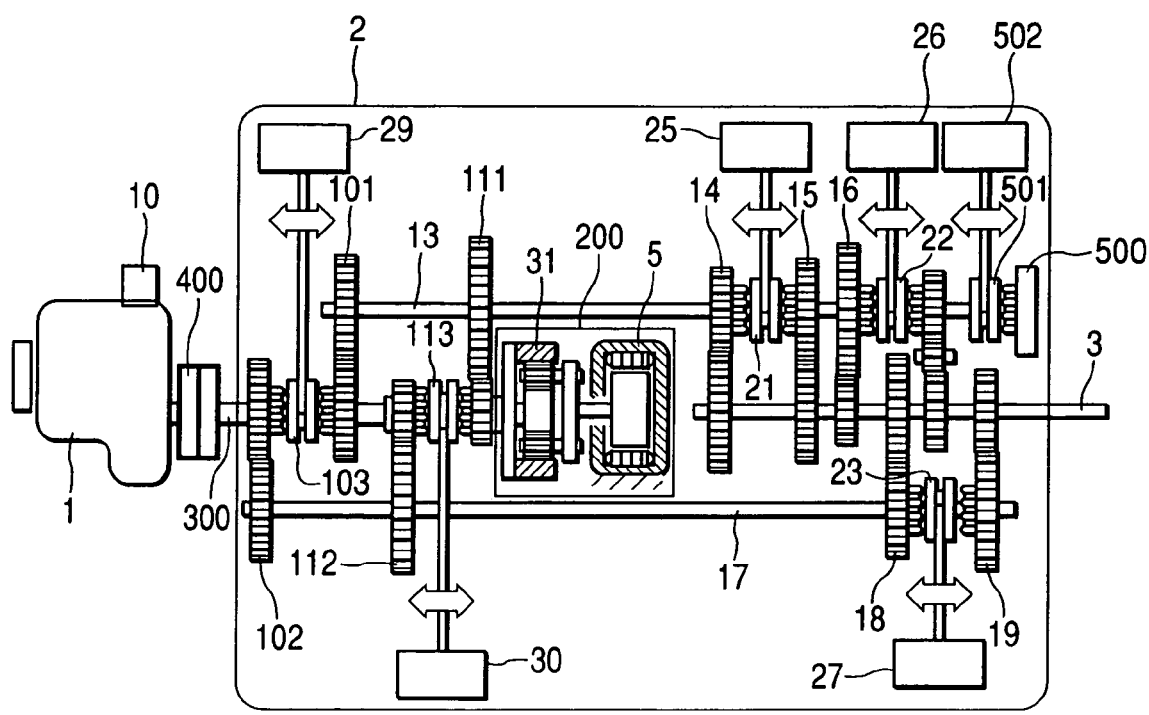
FIG. 12 shows a second embodiment of the present invention.

Further, as shown in FIG. 12, by providing a mechanism for fixing the first intermediate shaft, the vehicle can be allowed to run with the output of the shifting power unit while the vehicular drive system is left OFF. The following description is now provided about the operation with reference to FIG. 12.

First, the shift gear 18, the motor gear 112, and the direct-coupling gear 101, are engaged. If a dog clutch 501 is engaged with an intermediate shaft rotation fixing device 500, the intermediate shaft does not rotate. Therefore, if a negative torque is outputted from the motor, a torque is applied to the input shaft on the engine 1 side in a direction to decrease the rotational speed. Since the input shaft is connected with the first intermediate shaft which is engaged to the intermediate shaft rotation fixing device 500, the input shaft does not rotate. Consequently, all the motor torque passes through the shift gear 18 from the motor gear 112 and is transferred in a direction to increase the speed of the output shaft 3. As a result, the wheels rotate and thus the automobile can be started even without starting the engine. If a mechanism capable of power transfer and cut-off such as a clutch 400 is mounted on the input shaft, it becomes possible to disengage the clutch 400 (cut off power) and let the engine start up during vehicular running by the motor.

Insofar as the engine has been started, it is possible to make a shift to the vehicular running by the engine by disengaging the intermediate shaft rotating fixing device 500 and engaging the clutch 400, because there assumes a state of 1-2 shift. As the clutch 400, not only a friction clutch but also a dog clutch or a retarder are employable.

Figure 13A:
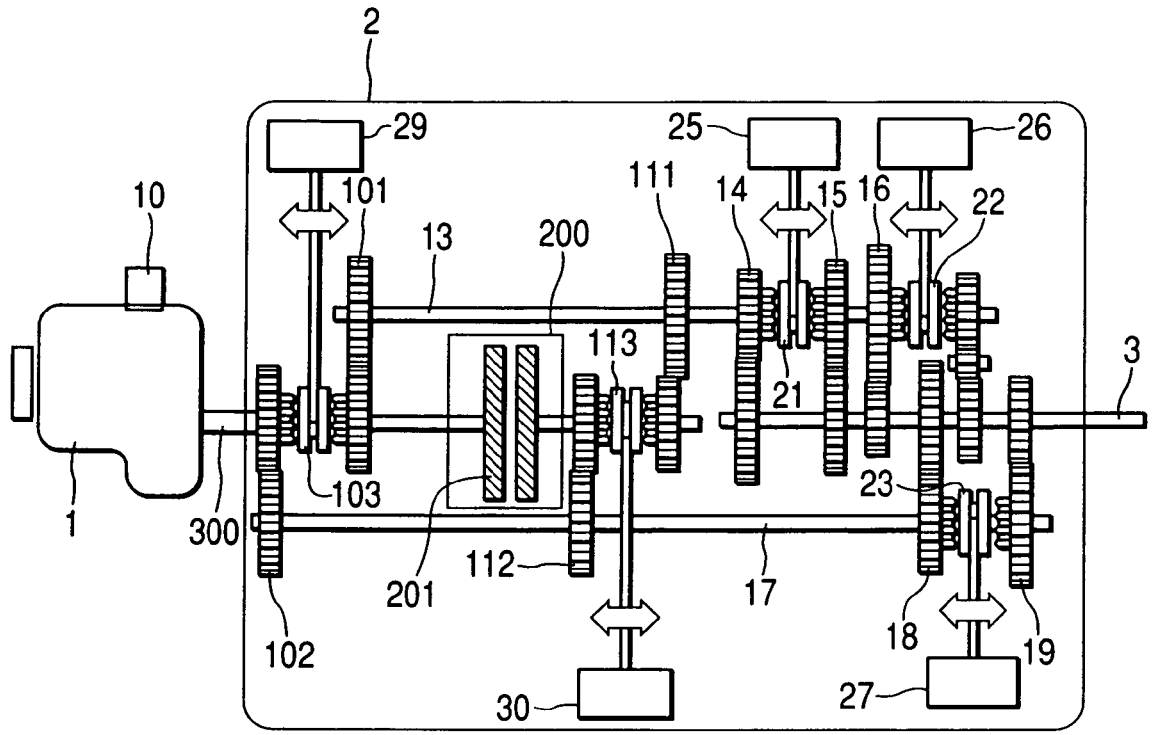
FIG. 13 shows a third embodiment of the present invention.
Figure 13B:
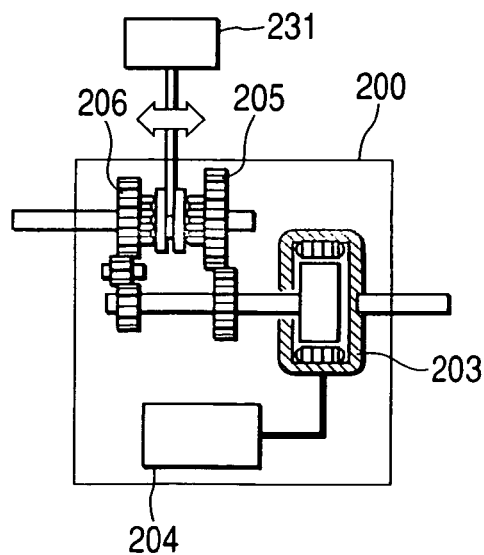

Although in the above embodiment the shifting power unit is constituted by the motor and the planetary gear mechanism, there may be used a friction clutch as shown in FIG. 13(a). If all the gear ratios of the direct-coupling gears 101, 102 and the motor gears 111, 112 are set at 1:1, the rotational speed of the two shafts of the shifting power unit is certain to become zero when the intermediate shaft reaches the gear ratio of the next shift range. Thus, by making engagement with use of a friction gear, it is possible to make a shift to a target gear. In this case, deterioration of durability is unavoidable, but the cost can be made lower than in the use of the motor. If there is used a mechanism called retarder which is used in an electric brake, it is possible to effect a smooth electric control under a reduced influence of friction. The retarder cannot control the rotational speed up to zero and therefore, if a speed increasing device is provided on the input shaft of the shifting power unit to surely create a rotational difference, as shown in FIG. 13(b), the above electric control can be attained. Moreover, since positive and negative rotational speeds are inputted to both shafts of the shifting power unit, it is necessary the rotating direction of the speed increasing device is made reversible.

Therefore, the control in question can be implemented by connecting a dog clutch 231 and a normal gear 205 and a reverse gear 206 to a retarder 203 as in FIG. 13(b) and making control through a retarder controller 204.

What is claimed is:

1. A control system for vehicular drive system comprising:
a vehicle driving power unit;
a shifting power unit having a motor and two rotary shafts actuated by the motor;
a controller for the motor;
an input shaft connected to the vehicle driving power unit;
two input gears mounted on the input shaft and capable of being engaged with and disengaged from the input shaft;
a first intermediate shaft;
a first driven gear mounted on the first intermediate shaft and meshing with one of the input gears;
a second intermediate shaft;
a second driven gear mounted on the second intermediate shaft and meshing with the other input gear;

a first shift gear train mounted on the first intermediate shaft and capable of being engaged with and disengaged from the first intermediate shaft;
a second shift gear train mounted on the second intermediate shaft and capable of being engaged with and disengaged from the second intermediate shaft;
a third driven gear train meshing with the first and second shift gear trains; and
an output shaft connected in common to the third driven gear train,
wherein one shaft of the shifting power unit is connected to the vehicle driving power unit and the other shaft of the shifting power unit is connected to the first and second intermediate shafts selectively through gears.

2. The control system according to claim 1, wherein a plurality of gears included in either the first or the second shift gear train are engaged simultaneously to fix the rotation of the first or the second intermediate shaft, and the fixed intermediate shaft and the shifting power unit are engaged with each other to output torque from the shifting power unit and thereby let the vehicle driving power unit start.

* * * * *